July 10, 1945.                D. O. BEAN                2,379,874
                    COMPENSATED MEASURING ELEMENT
                       Filed Feb. 8, 1943            3 Sheets-Sheet 1

Inventor:
Donald O. Bean
By Albert I. Kegan  Atty.

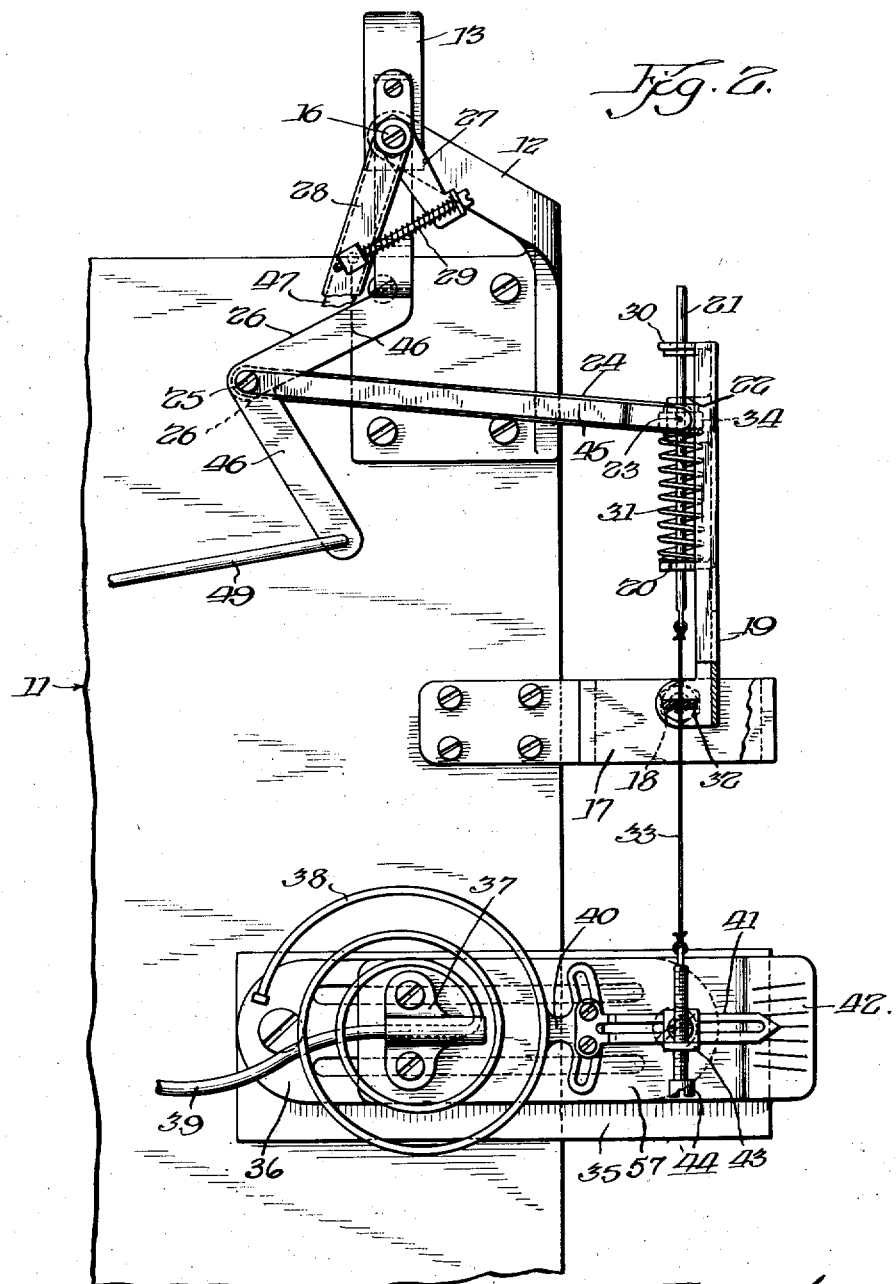

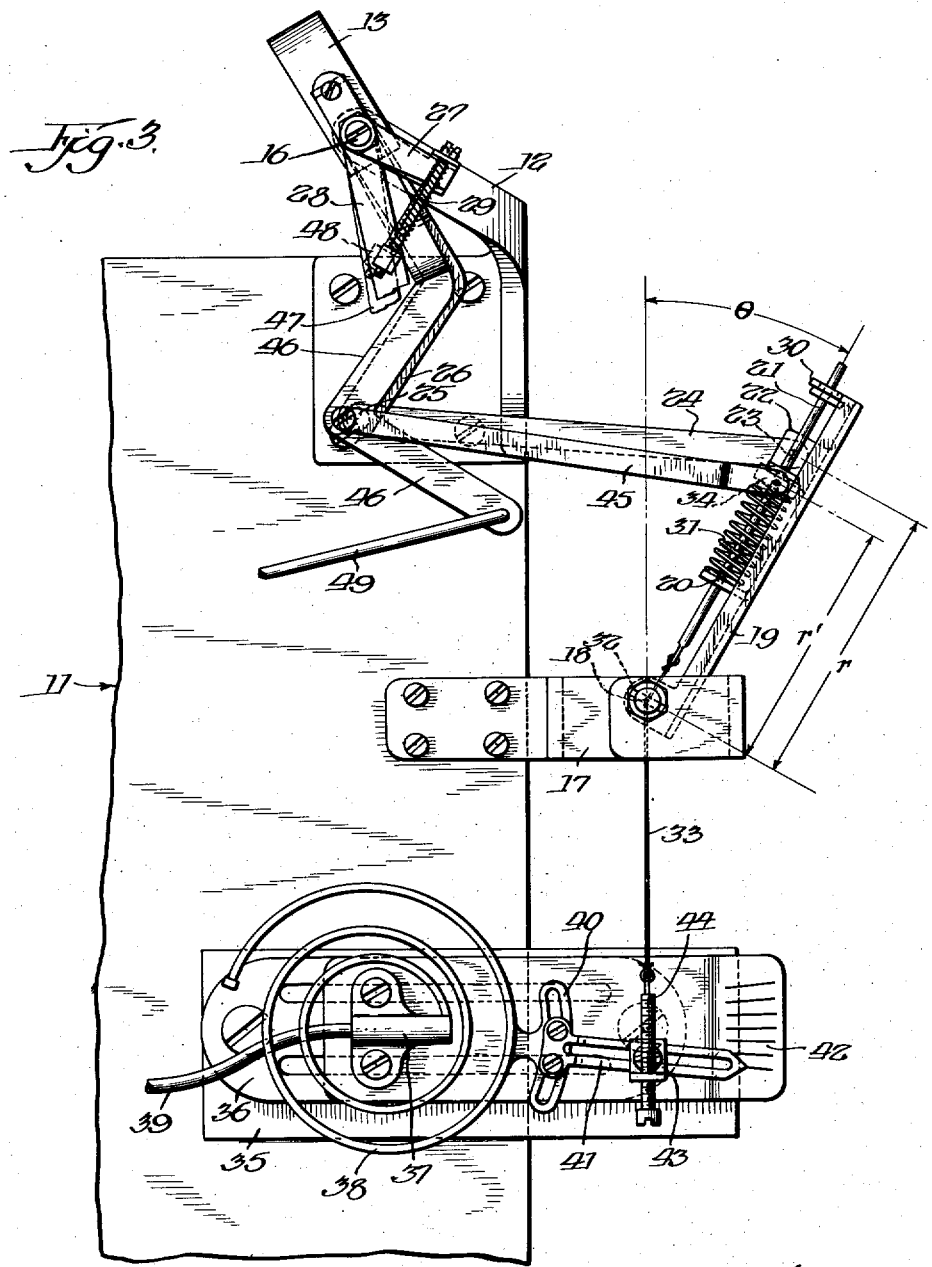

Patented July 10, 1945

2,379,874

UNITED STATES PATENT OFFICE 2,379,874

COMPENSATED MEASURING ELEMENT

Donald O. Bean, Chicago, Ill., assignor to Ring Balance Instrument Company, Chicago, Ill., a corporation of Illinois Application February 8, 1943, Serial No. 475,086

12 Claims. (Cl. 73—205)

This invention relates to measuring devices, and particularly to measuring devices compensated for the effect of a variable condition upon the quantity sought to be measured.

The principal object of the present invention is to provide a compensating measuring instrument of improved construction and characterized by a high degree of accuracy, reliability, simplicity, sturdiness, and ease of regulation and use.

In its broad aspect, the present invention comprises mechanism responsive to the actual magnitude of a variable uncorrected for the effect of another variable thereon, means actuated by said mechanism to angularly position a pivoted variable length lever in accordance therewith, a device responsive to a factor influencing the apparent magnitude of said first variable and operative to control the length of said variable length lever in accordance with the magnitude of said disturbing factor, and exhibiting means linked to the unpivoted end of the variable arm of said variable length lever to indicate the theoretical magnitude of said first variable after being corrected to a predetermined base condition.

It will be apparent that a measuring instrument of this kind has a wide field of industrial applicability. Measurement of rate of flow may be mentioned as one of these applications. Such measurement customarily is made by mechanism responsive to the differential pressure created by fluid flowing through an orifice plate or analogous primary element positioned in the conduit. The mechanism may record or otherwise indicate the rate of flow, and integrate the same with respect to time to register or otherwise exhibit the total quantity of flow. While the mechanism necessarily responds to the actual conditions prevailing, it ordinarily is desirable to exhibit the flow as it would be if certain ideal conditions prevailed. For example, it is usually desirable to indicate the flow as it would be if the temperature of the fluid remained constant at some predetermined base value; but in actual practice the temperature of the fluid fluctuates somewhat, and such fluctuations affect the apparent rate of flow. Again, gas may be sold on a weight basis, and deviations from the agreed base pressure produce error in the apparent weight rate of flow. Instruments constructed in accordance with the present invention exhibit corrected values duly compensated for the effect of these disturbing factors.

Thus, one embodiment of the present invention is a flowmeter comprising mechanism positioned by the differential pressure created by fluid flowing through a primary element, means positioned thereby to exhibit the apparent magnitude of the uncorrected rate of flow, a pivoted element whose angular position is controlled to correspond with that of said exhibiting means, a displaceable element on said pivoted element movable along the radial axis thereof, a calibrated thermometer system having the bulb thereof placed in the stream of flowing fluid, an arm positioned by said thermometer system in accordance with the temperature of said flowing fluid, a cable system connecting said arm and said displaceable element whereby the position of said arm controls the distance between said displaceable element and the center of rotation of the pivoted element upon which the latter is mounted, and indicating, recording, registering, or other exhibiting means linked to said displaceable member whereby said exhibiting means is controlled in accordance with the angular and radial position of said displaceable member to exhibit what the magnitude of the rate of flow would be at the predetermined base temperature, and in any desired system of units.

The pivoted element and the element thereon movable along the radial axis thereof together constitute a rotatable variable length arm. Advantageously, said pivoted element may consist of a specially shaped housing turning on a fixed supporting member, and the element movable thereon may consist of a piston in said housing. Said piston may be fixed to a guide rod located on the central longitudinal or radial axis of the housing and restricted to reciprocal movement along said axis. The thermometer system or other compensating device may be connected to said guide rod by means of a cable, and suitable guide means normally are provided to cause said cable to act on said guide rod through the center of rotation of said housing. Advantageously, a spring acting on said piston serves to keep said cable taut, thereby causing the radial displacement of said piston from the center of rotation of said housing to be accurately determined by the compensating device. Suitable adjusting means are provided for properly positioning the various elements of the mechanism with respect to each other and for calibrating the apparatus to cause the same to exhibit correct values.

The prime mover of the compensating device may be a Bourdon tube, and in one modification of the present invention such a Bourdon element controls the piston of the motion transformer through a segmental cam which acts as a lever arm of constant length. The Bourdon element may be used to compensate either for temperature effects or for fluctuations in base pressure. In the latter event, the inlet of the Bourdon tube is placed in the stream of flowing fluid to permit the pressure thereof to actuate the compensating device.

In order that my invention may be more fully disclosed, reference is had to the accompanying drawings which illustrate one form of apparatus embodying the foregoing and such other principles, advantages or capabilities as may be pointed out as this description proceeds, or as are inherent in the present invention. For purposes of clarity in exposition, the following description is explicit, and the accompanying drawings are detailed, but it is distinctly to be understood that said exposition is illustrative only, and that my invention is not restricted to the particular details recited in the specification or shown in the drawings.

In the drawings:

Figure 1 is a side elevational view, partly in section and with some parts broken away, of a compensated ring balance flow meter constructed in accordance with the present invention;

Figure 2 is a front elevational detail view of a portion of the supporting plate and the mechanism attached thereto, and shows the configuration of the same when the rate of flow is null and the fluid is at the predetermined base condition;

Figure 3 is similar to Figure 2, but shows the apparatus responding to maximum rate of flow and compensating for maximum deviation from the base condition; and Figure 4 is a fragmentary front elevational detail view of a modified form of the compensating element.

Like reference characters are used to designate similar parts in the drawings and in the description of the invention which follows:

Referring especially to Figure 1, it will be seen that the support 1 is provided with a cross arm 2 having ways 3, 3 thereon. The knife-edged shaft 5 of the hollow ring body 4 is pivoted on said ways 3, 3. Said ring body 4 is divided into two distinct compartments by liquid 6 in the lower portion thereof and a partition 7 in the upper part thereof. Each of the compartments in the ring body 4 is connected with a source of pressure through one of the inlets 8, 8. The range weight bracket 9 is fixed to the ring body 4 to rotate therewith, and carries the counterweight 53.

When the inlets 8, 8 are connected to opposite sides of a primary element, such as an orifice plate, pitot, venturi, or the like, and fluid is flowing through said primary element, a differential pressure is transmitted to the ring body 4 and causes it and the range weight bracket 9 to turn upon the ways 3, 3 until the torque exerted by the counterweight 53 exactly counterbalances the torque created by said differential pressure. The range weight bracket 9 also carries the cam 10, illustrated as a slotted disk cam. Thus the position of this cam is a measure of the differential pressure applied to the ring body 4, which differential pressure in turn is proportional to the square of the uncompensated apparent rate of flow. Advantageously, the cam 10 extracts the square root, so that the displacement of the cam follower 15 is directly proportional to the uncompensated apparent rate of flow.

The supporting plate 11 carries the stirrup shaped bracket 12. Pivoted on said bracket 12 is the yoke 13. Fixed to said yoke 13 are the follower links 14, carrying the cylindrical cam follower 15 therebetween. Also fixed to yoke 13 and having a common axis of rotation therewith is the housing positioning lever 26. The housing 19 turns upon a pair of pivots 18, 18 carried by the supporting strap 17, which is fixed to the supporting plate 11. The housing positioning lever 26 and the housing 19 are connected by the housing positioning link 24, which is pivoted to said lever by bearing 25 and to an ear 22 on said housing by bearing 23. Thus the angular deflection of the housing 19 is controlled by the position of the cam follower 15.

When the distance between pivots 16 and 25 is the same as the distance between pivots 18 and 23, the angular deflection of the housing 19 is the same as the angular deflection of the cam follower links 14, and I find it convenient (although by no means essential) to make use of this 1:1 ratio.

The motion transformer or variable length lever assembly comprises the housing 19, the guide rod 21 having the piston 34 fixed thereto, the pierced guide shaft 32, the piston positioning cable 33 passing therethrough, and the spring 31 confined between ear 20 and the under surface of piston 34 for maintaining said cable 33 under tension. The housing 19 is provided with a pair of parallel ears 20, 30 having bearings therein aligned with the center of rotation of said housing 19. The guide rod 21 passes through said bearings and may be reciprocated on its central longitudinal axis, which intersects the axis defined by the housing pivots 18, 18. The relative position of the piston 34 within the housing 19 is determined by a compensating device operatively connected with said piston 34.

The compensating assembly is mounted on strap 35 fixed to the supporting plate 11. The slotted guide bar 36 is secured to said strap 35. Laterally adjustable in the slots of said guide bar 36 is the dial plate 57, which carries the coiled Bourdon tube 38. Said Bourdon tube 38 coils or uncoils in response to pressure changes transmitted thereto through the inlet 39. If the Bourdon element is used to compensate for temperature, a thermometer bulb is placed in the stream of fluid near the primary element, and the vapor from said bulb fills the Bourdon tube 38, causing the same to move in accordance with changes in the temperature of said bulb. If the Bourdon element is used to compensate for pressure, it is turned over so that the Bourdon tube 38 would appear in Figures 2, 3, and 4 as a spiral wound clockwise outwardly from the base 37 thereof. The Bourdon inlet 39 communicates with the main conduit so that the tube 38 is filled with the fluid under test and responds to changes in the pressure thereof. Thus as the pressure decreases, the piston 34 is moved to decrease the lever arm r' (Fig. 3).

Mounted on the Bourdon coil 38 remote from the fixed end 37 thereof is the arcuately slotted arm 40. The radially slotted arm 41 is secured to said arm 40 and may be adjusted in the arcuate slot thereof to vary its position along the circumference of coil 38. To facilitate adjustment of the compensating device, a scale 42 may be provided adjacent the free end of the Bourdon lever 41. Said scale and arm also serve as an indicating device for exhibiting the magnitude of the temperature, pressure or other variable being corrected for.

Swiveled in the slot of the Bourdon arm 41 and laterally adjustable therein is the angle piece 43.

The micrometer adjusting screw 44 passes through a threaded bearing in the base of said angle piece 43. Said screw 44 and the guide rod 21 are connected by the cable 33. Pivoted coaxially with the housing pivots 18, 18 is the pierced rotatable idler 32 having a transverse bearing therethrough. The cable 33 passes through the bearing in said idler 32, which functions as a guide causing the compensating device to act on the rod 21 strictly along the longitudinal axis thereof regardless of the angular position of the housing 19. See Figure 3.

Advantageously, and as shown in Figure 2, the compensating assembly is adjusted so that the micrometer screw 44 is coaxial with the guide rod 21 when the rate of flow and the compensation thereof both are null.

The compensating assembly just described permits very nice control of the action of the variable under compensation upon the motion transformer assembly. The movement of the Bourdon tube 38 produced by a given increment of the actuating variable depends upon the constants of the tube, which are selected by appropriate choice of materials and dimensions. The position of the Bourdon arm 41 corresponding to any given configuration of the Bourdon tube 38 may be preselected by appropriate adjustment of said arm 41 in the arcuate slot of arm 40. The radial displacement of the piston 34 along the axis of guide rod 21 produced by a given movement of the Bourdon tube 38 depends upon the length of the lever arm through which said tube 38 acts, and this length is controlled by adjusting the position of the angle piece 43 in the slot of the Bourdon arm 41. And finally, the position of the piston 34 relative to its housing 19 at any given condition of the variable under compensation may be controlled by suitable adjustment of the micrometer screw 44.

Figure 4 illustrates a modified form of compensating device which acts on the cable 33 through a cam, such as the segmental cam 50. Said cam 50 is laterally adjustable on said arm 41. Fixed to said cam 50 is a threaded bearing 51, in which works the micrometer screw 52. The cable 33 is attached to said micrometer screw 52 and passes over said cam 50. Thus, the cam 50 permits the radial displacement of the piston 34 to be controlled in accordance with any desired function of the movement of the Bourdon tube 38. Advantageously, said cam 50 may serve as a means of calibration, whereby deviations of the Bourdon element 38 from its theoretical law of motion may be corrected for by appropriate shaping of the cam surface.

Referring again to Figures 1, 2 and 3, it will be seen that piston 34 and pen yoke 46 are connected by link 45. Said pen yoke 46 is pivoted coaxially with the follower link yoke 13. Exhibiting means, herein exemplified by a pen (not shown) adapted to trace a graph upon a rotating chart (not shown), is attached to pen yoke 46. Thus said piston 34 controls the position of said exhibiting means. Conveniently, said exhibiting means comprises a pen arm 47 pivoted to pen yoke 46 coaxially therewith. Pen arm 47 and pen yoke 46 are also joined by the adjusting screw 48, by means of which the pen can be adjusted to exhibit any selected value for any given angular deflection of the pen yoke 46, and thus to cause any given position of the piston 34 to exhibit any desired value upon the chart. One of the arms of pen yoke 46 may be connected to an integrator (not shown), as by the link 49, whereby the corrected rate of flow may be summated with respect to time to register the total quantity of flow.

If desired, exhibiting means may also be attached to the follower yoke 13 to indicate the magnitude of the uncorrected measurement. Said exhibiting means is illustrated as comprising the arm 27 rigidly joined to yoke 13, and the pen arm 28 pivoted to said arm 27 and adjustable with respect thereto by means of the adjusting screw 29.

The operation of the compensating measuring instrument illustrated in the drawings is apparent from the foregoing description of the construction thereof. The angular position of the housing 19 is controlled by the cam 10 in accordance with any desired function of the deflection of the ring body 4. The angular deflection $\theta$ (see Figure 3) of the guide rod 21 and piston 34 must always be the same as that of housing 19. The radial position of piston 34 is controlled by the compensating device in accordance with any desired function of the variable whose effect is to be eliminated. By "radial position of piston 34" I mean the distance between said piston and the center of rotation 18 of the motion transformer housing 19. The magnitude of this distance when the compensation is null is $r$; whereas $r'$ represents any other radial position of piston 34. See Figure 3.

Thus it is apparent that piston 34 functions as a variable length radius arm, its angular deflection $\theta$ being controlled by the ring body 4, and its length $r'$ being controlled by the Bourdon tube 38 or equivalent compensating mechanism. The corrected pen arm 47 is positioned by both the angular and the radial positions of piston 34, and therefore exhibits the resultant of a function of the ring body deflection corrected to eliminate the effect of temperature or some other variable condition of the fluid under test; or, to speak more broadly, the position of said exhibiting means is controlled in accordance with the magnitude of a first variable as corrected to eliminate the effect of a second variable thereon.

It is apparent that any pressure responsive device could be substituted for the ring body and cam illustrated in the drawings, and the present invention contemplates the use of such devices also. Similarly, any device motivated by changes in temperature, pressure, mass, volume, density or the like could be substituted for the Bourdon element illustrated herein, and all such devices are included in the scope of the present invention. Obviously the variable to be corrected for is not limited to those enumerated in the preceding sentence.

While the invention has been illustrated as applied to measurement of rate of flow, the compensated measuring instrument disclosed herein is of use wherever it is desirable to exhibit the resultant of a first variable as modified by the effect of a second variable thereon. Therefore I do not limit the scope of my invention to any of the details hereinbefore set forth, except as explicitly indicated in the appended claims.

I claim:

1. A ring balance flow meter compensated for the effect of variations in a condition of the fluid under test, comprising a hollow torus rotatably mounted on a support, a counterweight therefor, liquid and a partition dividing the interior of said hollow torus into two compartments each communicating with a separate source of pressure, a cam actuated by the rotation of said hollow torus, a vertically disposed supporting plate, a bracket fixed thereto, a yoke pivoted on said bracket and deflectable by the action of said cam, a housing pivoted on said supporting plate, a link for transmitting motion from said yoke to said housing, a piston in said housing, pivoted exhibiting means, a second link connecting said piston and said exhibiting means, a Bourdon tube adjustably attached to said supporting plate, an arm moved by said Bourdon tube, a cable connecting said arm and said piston, positioning means causing said cable to pass through the center of rotation of said housing, spring means in said housing resisting displacement of said piston, and means for adjusting the position of said piston relative to said arm.

2. In a ring balance flow meter including a hollow torus rotatably mounted on a support, liquid and a partition dividing the interior of said hollow torus into two compartments each communicating with a separate source of pressure, and a cam actuated by the rotation of said hollow torus, mechanism for exhibiting the rate of flow corrected for variations in temperature, comprising a supporting plate, a bracket fixed thereto, a yoke pivoted on said bracket and deflectable by the action of said cam, a housing pivoted on said supporting plate, a link for transmitting motion from said yoke to said housing, a piston in said housing, exhibiting means, a second link connecting said piston and said exhibiting means, a Bourdon tube responsive to the temperature of the fluid under test and adjustably secured to said supporting plate, an arm moved by said Bourdon tube, a cable connecting said arm and said piston, guide means causing said cable to pass through the center of rotation of said housing, spring means in said housing resisting displacement of said piston, and means for adjusting the position of said piston relative to said arm.

3. Mechanism for exhibiting the magnitude of a first variable corrected to eliminate the effect of a second variable, comprising a supporting member, a lever pivoted thereon, means for positioning said lever in accordance with the magnitude of said first variable, a housing pivoted on said supporting member, a link connecting said lever and said housing, a piston in said housing, pivoted exhibiting means, a second link connecting said piston and said exhibiting means, a device on said supporting member responsive to said second variable, flexible means for transmitting the response of said device to said piston, guide means causing said flexible means to act through the center of rotation of said housing, spring means in said housing resisting displacement of said piston, and means for adjusting the position of said piston relative to said device.

4. In a ring balance response to the uncorrected magnitude of a principal variable, a lever pivoted at one end and having a lever arm of variable length, mechanism for controlling the angular position of said lever in accordance with the deflection of said ring balance, a device responsive to the magnitude of a second variable affecting said principal variable, a cable having one end attached to said device and the other end attached to the variable arm of said lever, spring means on said variable arm of said lever coacting with said device to vary the length of said variable arm, and exhibiting means operatively connected with said variable lever arm whereby the position of said exhibiting means is controlled in accordance with the magnitude of said principal variable as corrected for the effect of said second variable.

5. In a measuring device, mechanism for exhibiting the resultant of functions of two variables, comprising a first member pivoted near one end, means actuated by a first variable for angularly positioning said first member in accordance with a function of said first variable, a second member movable along the radial axis of said first member, means actuated by a second variable, a cable connecting said second member with said means actuated by a second variable, and means acting on said second member to keep said cable taut, whereby said second member is positioned on said first member in accordance with a function of said second variable, exhibiting means, and mechanism connecting said second member and said exhibiting means whereby the position of said exhibiting means is controlled in accordance with both the angular deflection of said first member and the radial displacement of said second member thereon.

6. A measuring instrument comprising mechanism responsive to a first variable, a member pivoted at one end and angularly positioned by said mechanism in accordance with a function of said first variable, a device responsive to a second variable, a second member movable along the longitudinal axis of said pivoted member, a cable connecting said device with said second member, and means acting on said second member to keep said cable taut, whereby said second member is positioned relative to said first member in accordance with a function of said second variable, exhibiting means, and linkage connecting said movable member with said exhibiting means, whereby the position of said exhibiting means is controlled in accordance with a function of the magnitude of both said variables.

7. A measuring instrument or the like comprising a pivot, a housing turning thereon, mechanism actuated by a first variable and adapted to control the angular deflection of said housing in accordance therewith, a rod movably disposed in said housing with its longitudinal axis always intersecting said pivot, a member positioned in accordance with the magnitude of a second variable, a turnable pierced shaft coaxial with said pivot, a cable passing through said pierced shaft and connecting said member and said rod, spring means acting on said rod to keep said cable taut, micrometer means for adjusting the distance between said member and said rod, exhibiting means, and linkage connecting said rod and said exhibiting means whereby the position of said exhibiting means is controlled both by the angular deflection of said housing and by the radial displacement of said rod therein.

8. In a measuring device, a motion transformer comprising a pivot, a housing turning thereon, a link for transmitting motion to said housing, a rod movably disposed in said housing with the longitudinal axis thereof always intersecting said pivot, a turnable pierced shaft coaxial with said pivot, a cable passing through the aperture in said pierced shaft for displacing said rod, spring means acting on said rod to keep said cable taut, and a link for transmitting motion from said rod.

9. A measuring device or the like comprising a pivot, a housing turning thereon, mechanism actuated by a variable force for controlling the deflection of said housing, a rod movably disposed in said housing with the longitudinal axis thereof intersecting said pivot, a member positioned in accordance with the magnitude of a second variable, a cable connecting said member and said rod, guide means causing said cable to intersect the axis of said pivot, spring means in said housing yieldably resisting displacement of said rod, exhibiting means, and linkage connecting said rod and said exhibiting means.

10. A measuring device or the like comprising a lever pivoted at one end and having a lever arm of variable length, exhibiting means operatively connected with said lever arm of variable length, mechanism actuated by a first variable for controlling the angular position of said lever in accordance with the magnitude thereof, a support, a Bourdon tube laterally adjustable thereon, an arm angularly adjustable on said Bourdon tube, a threaded bearing swiveled on said arm, an adjustable micrometer screw in said bearing, and means causing the movement of said screw to vary the length of the variable arm of said lever, whereby the position of said exhibiting means is controlled in accordance with the magnitude of said first variable as modified by a second variable acting on said Bourdon tube.

11. A device for exhibiting instantaneous magnitudes of a first variable compensated for simultaneous effects of a second variable, comprising a lever pivoted at one end and having a lever arm of variable length, exhibiting means operatively connected with said lever arm of variable length, a device responsive to the magnitude of said first variable, mechanism actuated thereby to determine the deflection of said lever, a Bourdon element connected to respond to said second variable, a segmental cam positioned by the movement of said Bourdon element, and a cable fastened to an adjustable member fixed to said cam, said cable passing over said cam and connecting with the variable arm of said lever, whereby the length of said variable arm is varied in accordance with the magnitude of said second variable.

12. A motion transformer comprising a pivot, a guide member turning thereon, means for positioning said guide member, a second member on said guide member movable along an axis intersecting said pivot, a cable connected to said second member, means acting on said second member to keep said cable taut, and means positioned by said second member.

DONALD O. BEAN.

CERTIFICATE OF CORRECTION.

Patent No. 2,379,874. July 10, 1945.

DONALD O. BEAN.

It is hereby certified that error appears in the above numbered patent requiring correction as follows: In the grant, line 6, title of invention, for the word "ELEMENTS" read --INSTRUMENTS--; in the heading to the drawings, Sheets 1, 2 and 3 and in the heading to the printed specification, line 2, for "ELEMENT" read --INSTRUMENT--; and that the said Letters Patent should be read with this correction therein that the same may conform to the record of the case in the Patent Office.

Signed and sealed this 1st day of January, A. D. 1946.

Leslie Frazer (Seal) First Assistant Commissioner of Patents.

second variable, a cable connecting said member and said rod, guide means causing said cable to intersect the axis of said pivot, spring means in said housing yieldably resisting displacement of said rod, exhibiting means, and linkage connecting said rod and said exhibiting means.

10. A measuring device or the like comprising a lever pivoted at one end and having a lever arm of variable length, exhibiting means operatively connected with said lever arm of variable length, mechanism actuated by a first variable for controlling the angular position of said lever in accordance with the magnitude thereof, a support, a Bourdon tube laterally adjustable thereon, an arm angularly adjustable on said Bourdon tube, a threaded bearing swiveled on said arm, an adjustable micrometer screw in said bearing, and means causing the movement of said screw to vary the length of the variable arm of said lever, whereby the position of said exhibiting means is controlled in accordance with the magnitude of said first variable as modified by a second variable acting on said Bourdon tube.

11. A device for exhibiting instantaneous magnitudes of a first variable compensated for simultaneous effects of a second variable, comprising a lever pivoted at one end and having a lever arm of variable length, exhibiting means operatively connected with said lever arm of variable length, a device responsive to the magnitude of said first variable, mechanism actuated thereby to determine the deflection of said lever, a Bourdon element connected to respond to said second variable, a segmental cam positioned by the movement of said Bourdon element, and a cable fastened to an adjustable member fixed to said cam, said cable passing over said cam and connecting with the variable arm of said lever, whereby the length of said variable arm is varied in accordance with the magnitude of said second variable.

12. A motion transformer comprising a pivot, a guide member turning thereon, means for positioning said guide member, a second member on said guide member movable along an axis intersecting said pivot, a cable connected to said second member, means acting on said second member to keep said cable taut, and means positioned by said second member.

DONALD O. BEAN.

CERTIFICATE OF CORRECTION.

Patent No. 2,379,874.          July 10, 1945.

DONALD O. BEAN.

It is hereby certified that error appears in the above numbered patent requiring correction as follows: In the grant, line 6, title of invention, for the word "ELEMENTS" read --INSTRUMENTS--; in the heading to the drawings, Sheets 1, 2 and 3 and in the heading to the printed specification, line 2, for "ELEMENT" read --INSTRUMENT--; and that the said Letters Patent should be read with this correction therein that the same may conform to the record of the case in the Patent Office.

Signed and sealed this 1st day of January, A. D. 1946.

Leslie Frazer (Seal)         First Assistant Commissioner of Patents.